(No Model.) 4 Sheets—Sheet 2.
J. J. TINKER.
AMALGAMATOR.
No. 575,864. Patented Jan. 26, 1897.
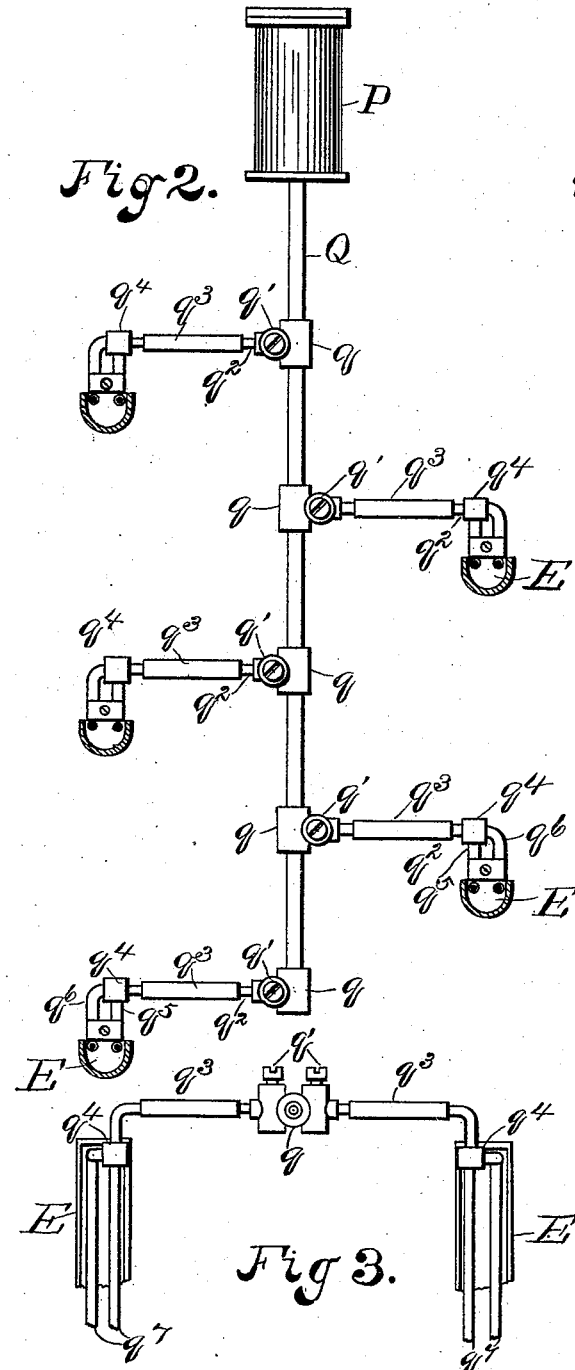
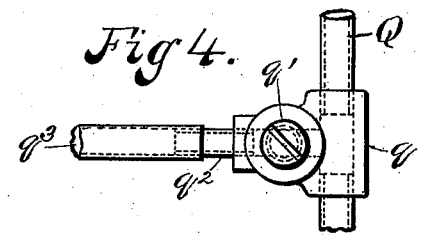
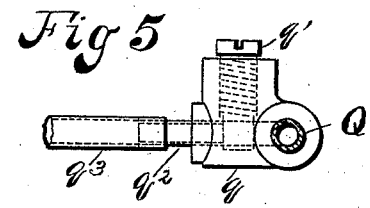
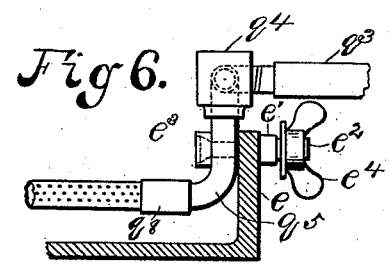
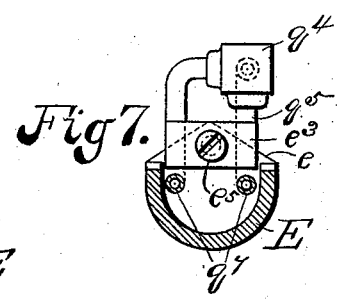
Witnesses
Jno. N. Holt
Percy C. Bowen
Inventor
J. J. Tinker,
by Whitman + Wilkinson
Attorneys.

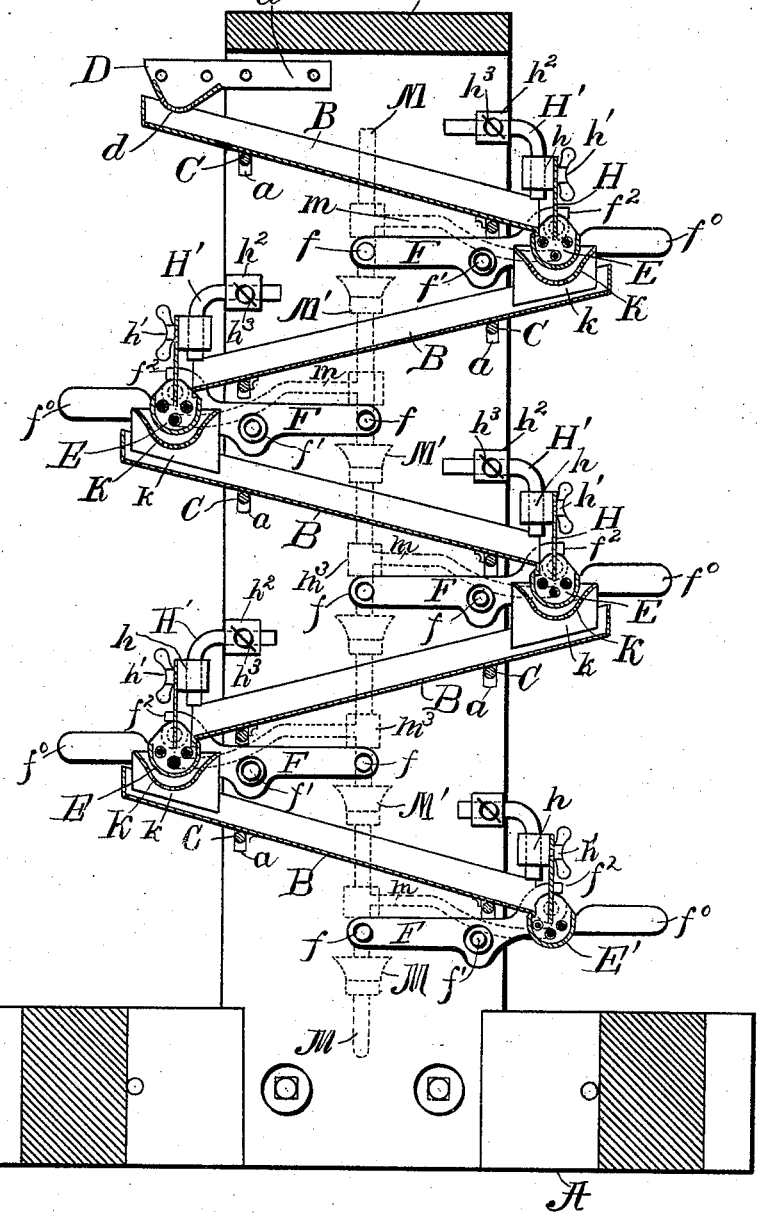

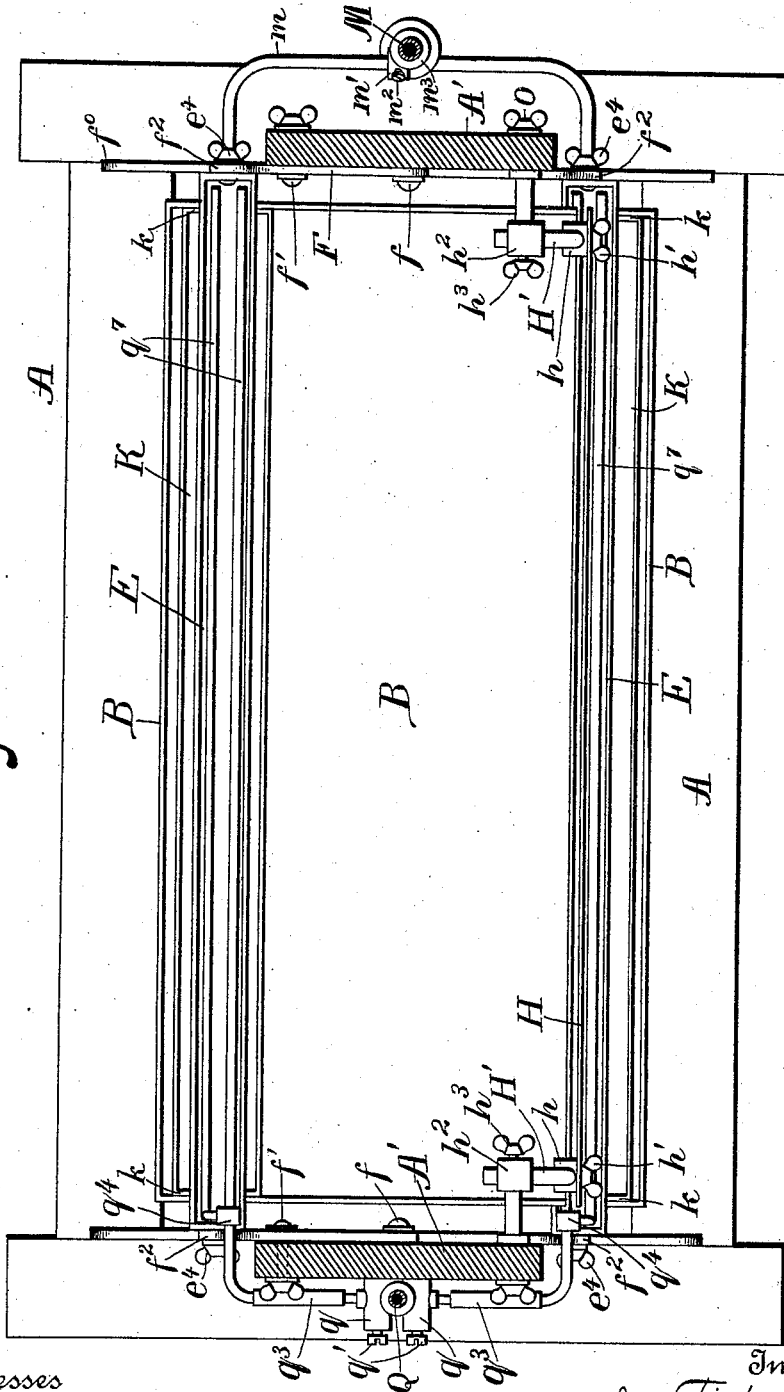

(No Model.) 4 Sheets—Sheet 4.

J. J. TINKER.
AMALGAMATOR.

No. 575,864. Patented Jan. 26, 1897.

Witnesses
Jno. H. Holk
Percy C. Bowen

Inventor
J. J. Tinker
by Whitman & Wilkinson
Attorneys

UNITED STATES PATENT OFFICE.

JAMES J. TINKER, OF PORTLAND, OREGON.

AMALGAMATOR.

SPECIFICATION forming part of Letters Patent No. 575,864, dated January 26, 1897.

Application filed April 4, 1895. Renewed June 29, 1896. Serial No. 597,483. (No model.)

*To all whom it may concern:*

Be it known that I, JAMES J. TINKER, a citizen of the United States, residing at Portland, in the county of Multnomah and State of Oregon, have invented certain new and useful Improvements in Amalgamators; and I do hereby declare the following to be a full, clear, and exact description of the invention, such as will enable others skilled in the art to which it appertains to make and use the same.

My invention relates to improvements in amalgamators for use in the separation of fine gold from auriferous material; and it is adapted for use with black sand, the product from batteries in quartz-mills, the soil from placer-mines, or any of the ores or gangues from which gold is ordinarily obtained.

My invention consists of certain novel features that will hereinafter be described and claimed.

Reference is had to the accompanying drawings, in which the same parts are indicated by the same letters throughout the several views.

Figure 9:
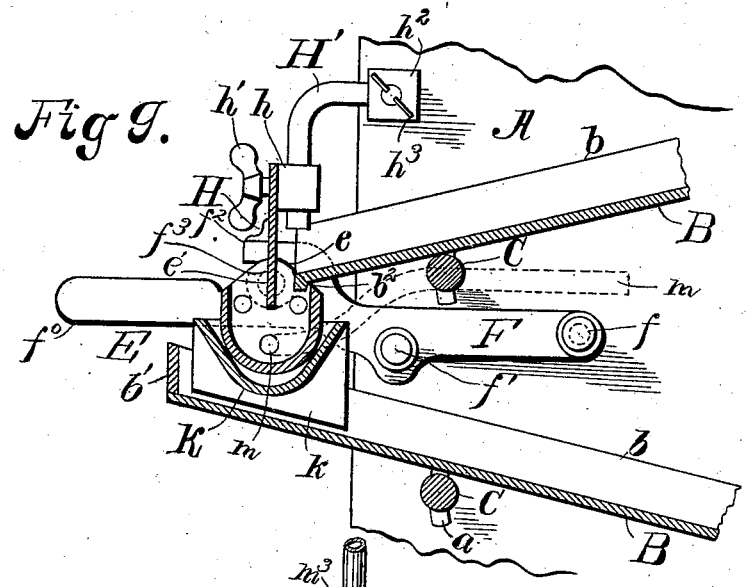
Figure 12:
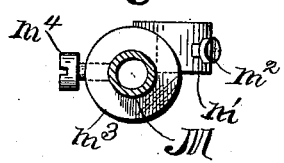
Figures 10, 11:
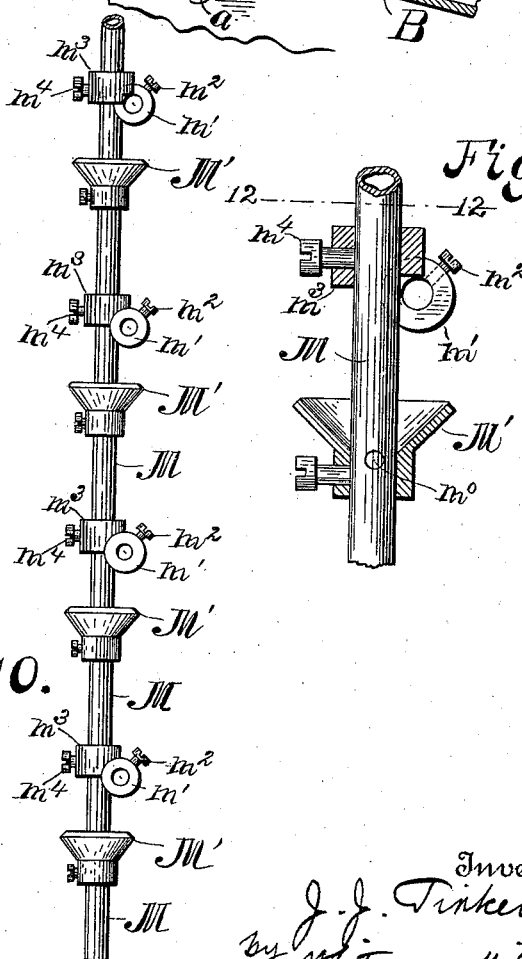

Figure 1 is a side elevation, partly in section, of the apparatus. Fig. 2 represents a detail view showing the apparatus for distributing the chemicals to the various troughs. Fig. 3 represents a detail view in plan, showing the pipe connections for carrying the chemicals to the troughs. Figs. 4 and 5 represent detail views in side elevation and in plan, respectively, showing the connection between the main pipe for the chemicals and the branch pipes. Fig. 6 represents an enlarged detail view showing one of the troughs in longitudinal section and the apparatus for admitting the chemicals thereinto. Fig. 7 represents a transverse section across the trough and apparatus shown in Fig. 6 and looking to the right in the said figure. Fig. 8 represents a horizontal section through the device shown in Fig. 1; and Fig. 9 represents a detail sectional view, on an enlarged scale, across one of the amalgamating-troughs and the adjacent parts. Fig. 10 represents a side elevation of the mercury-pipe detached from the apparatus. Fig. 11 represents a detail view, on an enlarged scale, of part of said pipe; and Fig. 12 represents a section along the line 12 12 of Fig. 11 and looking down.

A represents a base or support, preferably made of timber and provided with vertical boards $A'$, connected together by the top piece $A^2$. To these side boards $A'$ the end supports $d'$ of the feeding-trough D are connected, which trough is perforated, as at $d$, (shown in Fig. 1,) to allow the contents thereof to drop on the upper inclined plate B. There are a number of these plates B arranged zigzag across the frame and supported upon the cross-rods C, which pass through the elongated slots $a$ in the side boards $A'$, and are clamped in position by thumb-screws similar to that shown at $e^4$ in Fig. 6. These cross-rods C may be clamped at any desired position in the slots $a$, and thus afford a ready means for adjusting the pitch or slant of the plates B. These plates B are preferably made of copper, and are closed at the upper end, as at $b'$, and bent down at the lower end, as at $b^2$, while they are provided with vertical sides $b$, all as shown most clearly in Fig. 9. The lower end of each one of these plates B empties into a trough E, partly filled with quicksilver.

The material passing down the plates B is prevented from being shot over the trough by means of a splash-plate H, which is connected to the sliding block $h$, which block is clamped on the bent rod $H'$ by means of the thumb-screw $h'$, and thus the said splash-plate may be given vertical adjustment. The upper end of the bent rod $H'$ passes through the block $h^2$, secured to the side board $A'$, and is clamped therein by means of the clamp-screw $h^3$, and thus the said splash-plate is given lateral adjustment.

The trough E is given both vertical and lateral adjustment as follows: The ends of the trough E project upward, as at $e$, and are provided with a lug $e'$, which engages in a fork $f^3$ beneath the arm $f^2$ of the lever F. This lug $e'$ terminates in a screw-thread $e^2$, on which is mounted the clamp-screw $e^4$, as shown in Fig. 6, by means of which the ends of the trough may be clamped at the desired position, horizontally, relative to the lower end of the plate B.

The lever F is pivoted, as at $f$, and is provided with a handle $f^0$ and a clamp-screw $f'$, which passes through a slot in the side board $A'$ and clamps the lever F at any desired position. In this way the trough E is given the desired vertical adjustment relative to the end of the plate B.

Beneath the trough E is an outer trough K, perforated along its bottom, as shown in Fig. 9, and secured by means of the end plates $k$ in the inclined plate B.

The material from each upper plate B falls into the trough E and overflowing this trough falls into the outer trough K, and thence falls into a lower inclined plate B, and so on.

The residue in each trough E, which consists of quicksilver carrying the fine gold, is drawn off by the tubes $m$, whose ends are secured in the sleeves $m'$ by the set-screws $m^2$, which sleeves are attached to the blocks $m^3$, adjustably connected to the pipe M by means of the screws $m^4$, as shown in Figs. 10 to 12. When it is desired to draw the mercury out of the troughs E, these blocks $m^4$ are moved down on the pipe M from the position shown in Figs. 1 and 9, so that the mercury will run down through the tubes $m$, and falls from the sleeves $m'$ into the funnels M', which catch the mercury and direct it through the holes $m^0$ into the pipe M, from which it may be drawn off into a suitable vessel for the evaporation of the mercury and the separation of the gold.

The mercury in the various troughs E is kept pure by means of the chemicals, which are well known as suitable for this purpose, preferably the ordinary well-known sodium compounds. These chemicals are preferably poured into a receptacle P, placed above the apparatus, which opens into a lower pipe Q. This pipe Q is provided with a number of T-couplings $q$, having screw-valves $q'$, controlling the tubes $q^2$, which are connected by the flexible rubber tubes $q^3$ to the delivery-block $q^4$, to which are connected the branch tubes $q^5$ and $q^6$, connected to the horizontal tubes $q^7$, running longitudinally in the troughs E, as shown in Figs. 3 and 6. These horizontal tubes $q^7$ are perforated, as shown in Fig. 6, and for convenience of manufacture are preferably connected to the branch tubes $q^5$ and $q^6$ by means of rubber couplings $q^8$. These branch tubes $q^5$ and $q^6$ are held in place by means of the screw $e^5$, which passes through the plate $e^3$ and thus binds the said tubes to the end $e$ of the trough E, as shown in Fig. 7. In this manner the chemicals are finally divided and are distributed uniformly throughout the length of the trough. The ends of the tubes $q^7$ opposite to the branch tubes $q^5$ and $q^6$ are closed, thus causing the chemicals to escape through the perforations in the said tube $q^7$.

The apparatus is preferably arranged with the appliances for feeding the chemicals at one end thereof and the appliances for drawing off the heavier matter in the bottom of the trough Q at the other end thereof, while the finely-divided material D is fed to the trough from the side of the apparatus.

It will be seen from the foregoing that the plates B, the splash-plates H, and the troughs E may be readily adjusted to suit the varying conditions to which the apparatus would need to be adapted. Thus certain kinds of ore would have to be passed more slowly through the machine than other kinds, and again it may be desirable to pass the ores slower through one part of the machine than through the other.

The operation of the device will be readily understood by any one skilled in the art, and it will be only necessary to state, briefly, that the finely-divided material is fed into the trough D, which extends the whole length of the machine, and falling through the perforations $d$ slides down the upper amalgamated copper plate B, from which it drops into the trough containing mercury E. Overflowing this trough it falls into the trough K, and dropping through the perforations therein or overflowing the sides thereof it falls onto the second inclined amalgamated plate B. The splash-plate H prevents the material from shooting over the trough E, and this splash-plate, as well as the trough K, should preferably be made of copper and amalgamated for the purpose of catching any fine gold that might pass in juxtaposition thereto. After passing over the second amalgamated plate B the ore continues its zigzag course until finally when it reaches the bottom trough E it is pretty well deprived of any fine gold that was originally contained therein.

It will thus be seen that an exceedingly compact apparatus is provided which affords a large amalgamating-surface and repeated breaks in the layer of material subjected to the said amalgamated surface. The advantage of these breaks or bendings back in direction may be illustrated by the passage of a continuous belt over the various plates B, where it will be seen that one side of the belt will press on the plate above and the opposite side of the belt will press on the plate below and thus where several zigzag plates are employed the opposite sides of the belt would be treated *seriatim*. This analogy does not entirely hold, since the material is pulverized and since it passes into intermediate troughs, which tend to alter the arrangement of the particles, but at the same time it will be evident that the zigzag arrangement secures a very much more perfect contact of all the particles in the moving mass with the amalgamating-surfaces. These and the various other advantages of the herein-described construction will readily suggest themselves to any one skilled in the art.

It will be obvious that many modifications and changes in the herein-described apparatus might be made which could be used without departing from the spirit of my invention.

Having thus described my invention, what I claim, and desire to secure by Letters Patent of the United States, is—

1. An amalgamator provided with a series of amalgamated plates arranged zigzag one above the other, troughs containing mercury interposed between said zigzag plates, at the lower end of one plate and at the upper end of the plate below, pipes for drawing off the heavier liquid at the bottom of said troughs, perforated tubes longitudinally arranged in said troughs, a supply-pipe for chemicals connected to said perforated tubes, and means for feeding ore to said amalgamator and for supplying chemicals to said supply-pipe, substantially as described.

2. An amalgamator provided with a transverse trough with perforations in the bottom thereof and extending across the upper portion of said amalgamator, a series of amalgamated plates arranged zigzag one above the other and receiving the ore from said perforated trough, troughs containing mercury interposed between said zigzag plates, at the lower end of one plate and at the upper end of the plate below, pivoted hand-levers supporting said troughs, and means for clamping the said levers in any desired position, and means for drawing off the heavier liquid at the bottom of said troughs, substantially as described.

3. An amalgamator provided with a plurality of vertically-adjustable transverse amalgamated plates, arranged zigzag, and one above the other, with troughs containing mercury placed at the lower end of one plate and the upper end of the plate below, and in the path of the auriferous material, pivoted hand-levers supporting said troughs, and means for clamping said levers in any desired position, and means for feeding the ore to the upper plate, substantially as described.

4. An amalgamator provided with a plurality of vertically-adjustable transverse amalgamated plates, arranged zigzag and superimposed one above the other, with troughs containing mercury arranged between the said plates, and in the path of the auriferous material, lugs on the ends of said troughs, pivoted hand-levers having a forked arm engaging said lugs, means for adjustably clamping said lugs in said forked arms, and for clamping said levers at any desired position, substantially as described.

5. An amalgamator provided with a plurality of vertically-adjustable transverse amalgamated plates, arranged zigzag one above the other, with troughs containing mercury arranged at the lower end of one plate and at the upper end of the plate below, and in the path of the auriferous material, lugs on the ends of said troughs, pivoted hand-levers having a forked arm engaging said lugs, means for adjustably clamping said lugs in said forked arms and for clamping said levers at any desired position, amalgamated splasher-plates projecting into said troughs, bent arms supporting said splasher-plates and adjustably connected thereto and to the framework, and means for feeding the ore to the upper inclined plate, substantially as described.

In testimony whereof I affix my signature in presence of two witnesses.

JAMES J. TINKER.

Witnesses:
CHESTER V. DOLPH,
M. D. WISDOM.